A. Dunbar,
Horse Collar,
No. 78,075. Patented May 19, 1868.

Witnesses:
H. C. Ashketter
J. A. Fraser

Inventor:
A. Dunbar
per Munn & Co.
Attorneys.

United States Patent Office.

ALEXANDER DUNBAR, OF NEW YORK, N. Y.

Letters Patent No. 78,075, dated May 19, 1868.

---

IMPROVED HORSE-COLLAR AND HAMES.

---

*The Schedule referred to in these Letters Patent and making part of the same.*

---

TO ALL WHOM IT MAY CONCERN:

Be it known that I, ALEXANDER DUNBAR, of the city, county, and State of New York, have invented a new and improved Horse-Collar and Hames; and I do hereby declare that the following is a full, clear, and exact description thereof, which will enable others skilled in the art to make and use the same, reference being had to the accompanying drawings forming part of this specification, in which—

Similar letters of reference indicate corresponding parts.

Figure 1:
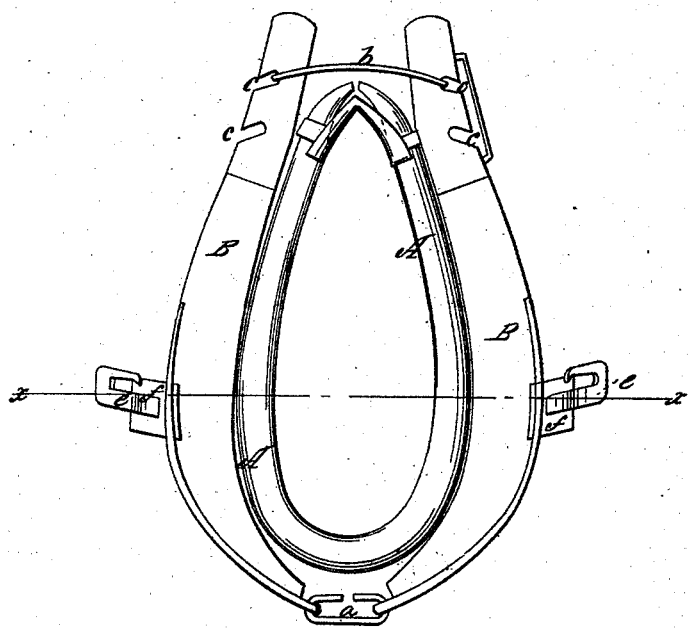
Figure 1 represents a rear view of my improved horse-collar and harness.
Figure 2:
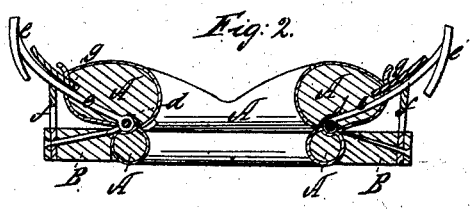
Figure 2 is a horizontal section of the same, taken on the plane of the line $x\,x$, fig. 1.

This invention relates to a new horse-collar, of that class which is known as the folding collar, that can be opened on top, so as to be put around the horse's neck, without having to be slipped over the head of the same.

The invention consists in the use of a metal link, which serves to fasten the upper ends of the hames together, and which is adjustable in notches cut into the hames, so as to adapt the device to various-sized horses.

The invention relates, also, to a new manner of attaching the draught to the hames, and consists in attaching the draught-bar to the rear inner corner of the hames, so that it passes through the body of the collar. Thereby the draught serves to draw the collar and hames off the neck of the horse, and not to press them against the same, as usual, and the horse will be relieved from much inconvenience and pressure.

A, in the drawing, represents a horse-collar of ordinary or suitable construction. It is not closed on top, but can be swung open, as above set forth.

B B are the hames. They are arranged on the front side of the collar in the usual manner, and have a link, $a$, at the bottom, by which the two arms constituting the hames are connected. At the top, these two arms are connected by means of a link, $b$, which fits into the notches $c\,c$, that are cut into the hames, as shown in fig. 1. A series of such notches may be provided, to allow the up-and-down adjustment of the link. The link can be easily removed, and the hames and collar opened at the top.

To the inner rear corner of each arm of the hames is secured a staple, $d$, projecting towards the inside, as shown, and to each staple is attached or hinged a draught-hook, $e$, which passes through the body of the collar to the outside, as shown, and which also passes through a slotted plate, $f$, that is secured to the outside of the hames-arm. The plate $f$ is slotted, and that portion, $g$, of it which is cut out to form the slot is bent into the collar, as shown, and forms a support for the hook $e$, to prevent the same from wearing the collar. The main object, however, of the plate $f$, is to prevent the draught from pressing the collar against a particular portion of the horse's breast, and to confine the draught to the hames.

By this arrangement the power of the horse will be greatly increased, and the draught will be brought into a more convenient position than is done by the ordinary methods.

Having thus described my invention, what I claim as new, and desire to secure by Letters Patent, is—

1. The draught-hook $e$, attached to the staple $d$, and passing through the collar A, and a slotted plate, $f$, attached to the hames, said plate $f$ having its part G bent into the collar, all constructed and arranged to operate as herein described for the purpose specified.

2. In combination with the hames B and collar A, the adjustable link $b$, as herein described for the purpose specified.

ALEX. DUNBAR.

Witnesses:
A. V. BRIESEN,
ALEX. F. ROBERTS.